(12) United States Patent  
Pedersen

(10) Patent No.: US 8,073,386 B2
(45) Date of Patent: *Dec. 6, 2011

(54) BROADBAND COMMUNICATION PLATFORM AND METHODS OF NETWORK OPERATION

(75) Inventor: Erling Pedersen, Coral Springs, FL (US)

(73) Assignee: Innovative Wireless Sweden AB, Växjö (SE)

( * ) Notice: Subject to any disclaimer, the term of this patent is extended or adjusted under 35 U.S.C. 154(b) by 1326 days.

This patent is subject to a terminal disclaimer.

(21) Appl. No.: 11/676,488

(22) Filed: Feb. 19, 2007

(65) Prior Publication Data

US 2007/0195941 A1 Aug. 23, 2007

Related U.S. Application Data

(63) Continuation of application No. 10/269,115, filed on Oct. 7, 2002, now Pat. No. 7,181,206.

(60) Provisional application No. 60/328,909, filed on Oct. 11, 2001.

(51) Int. Cl.
*H04B 5/00* (2006.01)
(52) U.S. Cl. .................... 455/12.1; 455/13.1; 455/13.3; 455/425; 370/537; 370/540
(58) Field of Classification Search ................. 455/12.1, 455/13.1, 13.3, 25, 425; 370/537–540
See application file for complete search history.

(56) References Cited

U.S. PATENT DOCUMENTS 6,330,460 B1* 12/2001 Wong et al. ................ 455/562.1
2002/0042919 A1* 4/2002 Sturza et al. .................... 725/67
* cited by examiner

*Primary Examiner* — Yuwen Pan
(74) *Attorney, Agent, or Firm* — William R Bachand

(57) ABSTRACT

A subscriber platform according to various aspects of the present invention, includes an antenna and a receiver coupled to the antenna. The subscriber platform is operated by a subscriber. A method performed by the subscriber platform includes, in any practical order: (a) receiving non-redundant information on several channels, each channel associated with a direction of the antenna and a frequency for receiving information; (b) aggregating the information into a sequence; and (c) displaying a presentation in accordance with the sequence.

8 Claims, 4 Drawing Sheets

BROADBAND COMMUNICATION PLATFORM AND METHODS OF NETWORK OPERATION

CROSS-REFERENCE TO RELATED APPLICATIONS

This application is a continuation of and claims priority under 35 U.S.C. §120 from U.S. patent application Ser. No. 10/269,115 filed Oct. 7, 2002 now U.S. Pat. No. 7,181,206 by Pedersen, which claims benefit under 35 U.S.C. §119(e) of U.S. provisional patent application, incorporated herein by this reference, Ser. No. 60/328,909 filed Oct. 11, 2001 by Pedersen.

FIELD OF THE INVENTION

Embodiments of the present invention relate to broadband communication and to platforms, networks, and methods using broadband communication.

BACKGROUND OF THE INVENTION

Broadband communication is the most sought after commodity in today's communication market. Bundling of services has become the ultimate desire of all users in today's market. Over the past many years, new technologies have emerged in the field of communication, where the invention of the Internet is one of the most prominent advancement in modern history. Because of its popularity, the Internet has become congested, operating at capacity, and is in desperate need of additional bandwidth to accommodate even more users wanting to take advantage of the new advances in the field of communication.

Fiber-optic cable systems have been hailed as the ultimate broadband solution, but cost prohibitive constraints and other factors that limit application of fiber optic cable systems for data transport to all homes have curbed the spread of this technology. Operators have been looking for a "last mile" solution (e.g., a communication technology for subscribers that are more or less a mile from the end of a wired network) to bring their communication products directly to the consumers. Fiber optic cable systems turned out to be only a partial answer to a complex problem.

Satellite systems have been used unsuccessfully to provide connectivity anywhere and anytime. Lack of sufficient bandwidth has been the main reason that prevented the satellite entrepreneur's success in the past.

What is needed for delivery of bundled services is a communication technology having a backbone with relatively large bandwidth compared with conventional systems. Bundled services would include telecommunication traffic (fixed and mobile), Internet traffic, distant personal information computing, and interactive multimedia services (e.g., television, video on demand, and pay-per-view). Bundled services would be delivered to all users no matter where they were located.

It has been clear to the industry for a long time that the existing backbone is not adequate for expected future demand. A new and better backbone is desired over patching the old one. So far, attempts to find a broadband delivery technology for bundled services have not been entirely successful. Conventional systems have provided bundled services for a couple of modalities, but bandwidth is not sufficient for growth.

Without platforms, networks, and methods of the present invention, the current demand for increased bandwidth will not be economically met. Bandwidth is a colloquial expression for the data rate into or out of subscriber equipment. A typical video presentation may require a continuous stream of 5 Mbps. If a network can support 10 Mbps, then two users desiring a video presentation could share the network but would consume the entire bandwidth of the network. If a third user began consuming data at a rate of 3 Mbps, there could be a noticeable degradation of the quality of service provided by the network (e.g., original users see skips in video presentations).

SUMMARY OF THE INVENTION

A subscriber platform, according to various aspects of the present invention, includes an antenna and a receiver coupled to the antenna. The subscriber platform is operated by a subscriber. A method performed by the subscriber platform includes, in any practical order: (a) receiving non-redundant information on several channels, each channel associated with a direction of the antenna and a frequency for receiving information; (b) aggregating the information into a sequence; and (c) displaying a presentation in accordance with the sequence.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
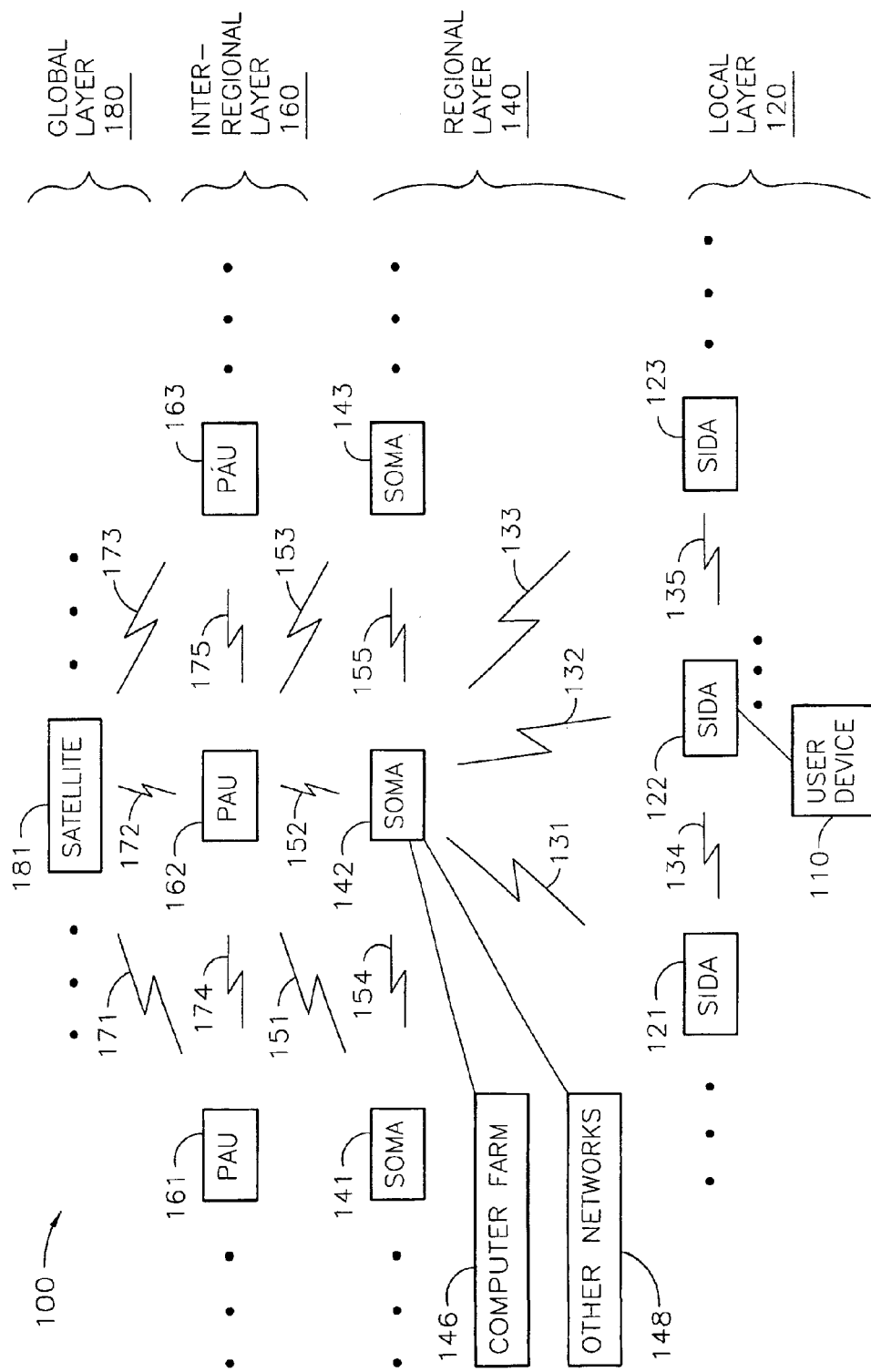
FIG. 1 is a functional block diagram of a broadband communication network according to various aspects of the present invention.

A wireless interactive super broadband communication network (hereinafter a "WISB" network), according to various aspects of the present invention, includes interactive communications platforms. A bandwidth in excess of 1 Gigabit per second for user devices is hereafter referred to as "super broadband". Super broadband applies to any mix of fixed wireless access ("FWA") and mobile wireless access ("MWA") applications. Such a wireless interactive super broadband communication network includes a distributed infrastructure typically having: (1) a plurality of platforms hereinafter called SIDA platforms; (2) a plurality of platforms hereinafter called SOMA platforms; and (3) a plurality of platforms hereinafter called PAU platforms.

A SIDA platform (named after the small, interactive, directional antennas that are part of a SIDA platform) includes an antenna unit and a transceiver unit. Each transceiver is preferably a low cost, low power, electromagnetic transceiver. A SIDA platform (also called a SIDA cell) may be implemented as a cell having the antenna unit mounted on the roof of a building. Each antenna unit includes a random angle beam-forming antenna network (e.g., a phased array of antenna elements). The antenna network (a circuit) may have 16, 32, or 64 beamformers.

A SOMA platform (named for a part of a neuron) may be implemented as a regional tower mounted platform with transceivers for coordinating communication within clusters of SIDA platforms. A SOMA platform is also called a SOMA tower.

A PAU platform (standing for the Purkinjie antenna unit, Purkinjie being the name for a particular neuron) provides a longer range transceiver unit for conveying signals over large distances via troposcatter, fiber optic, and/or low earth orbit satellite systems (LEOS).

A WISB network provides automated full duplex routing of messages. A WISB network provides super broadband intercommunication between subscribers. The WISB network is expandable to alleviate "bottlenecks" or network traffic congestion. Traffic in a WISB network may be multipoint to multipoint, point to multipoint, or point to point. The WISB network may be implemented with conventional protocols for link management, multi-hop routing and multicasting, remote network management, and network security.

A WISB network generally operates in multiple layers. Each layer may use channels of high frequency radio communication bands, such as between 2.4 GHz to 30 GHz. An initial commercial embodiment of a WISB network was designed for the unlicensed 5.8 GHz frequency band.

Because each user (e.g., a SIDA platform) can communicate on simultaneous independent channels by frequency and directional diversity, a WISB network may provide 256 Mbps of bandwidth per individual user. For example, operating at 5.8 GHz, a WISB network may provide between 3.8 Gbps to 12.8 Gbps of bandwidth to particular users.

The WISB network may be implemented with digital transceiver systems and operating protocols for preventing interference of signals on a single frequency and eliminating crossover signals. Platforms having directional antenna beams facing each other may use them to communicate or may avoid communication by using frequency diversity. Networks according to various aspects of the present invention may accommodate a large number of users (e.g., thirty-four times the number of users compared to conventional networks) by facilitating a multiplicity of users on a single frequency (frequency diversity).

Each SIDA platform of a WISB network may include a home gateway controller. A home gateway controller may be implemented using a conventional operating system and a television screen (or other monitor as the primary display). The home gateway controller may operate as an alternative personal computer; and, due to the abundance of available bandwidth, may use remote computer farms (e.g., personal information (PI) computing) to process and store information requiring large capacity processing and storage. WISB network platform operating software enables personal computers to be hooked up to a WISB network through a software/hardware interface. A home gateway controller may have a secure video-on-demand module that operates as an alternative "video rental store", making electronically accessed global film and music libraries available. A home gateway controller may incorporate a financial card swipe capability making it possible to purchase video on demand and other Internet services directly from the home through secure "Wallet Banking" software.

Any platform (e.g., a SIDA platform) of the present invention may be implemented with integrated circuits, processors, and miniaturized transceivers to operate within a handheld device.

A WISB network may include a low earth orbit ("LEO") space segment that provides a communications-bridge for the terrestrial portions of the WISB network via PAU platforms. A WISB network LEO space segment may provide a super broadband orbital platform for commercial aviation. Airplane manufacturers can implement any mix of platforms in aircraft. In such an embodiment, the aircraft communicates with a WISB network space segment, which in turn communicates with a WISB network terrestrial segment. Passengers (e.g., users of SIDA platforms) may enjoy a plethora of interactive communication services including in flight telephony, video conferencing, video on demand, music on demand, and video games. In addition, data that is normally recorded and stored on a "black box" (e.g., a flight recorder) onboard the aircraft may be electronically transmitted to earth-based data storage facilities using WISB network components. The amount of data that can be recorded is increased and the disadvantages associated with onboard flight recorders are eliminated.

Security may be enhanced on aircraft via onboard high definition cameras, which would be able to transmit clear images and sound in real time via a platform to platform space-terrestrial pathway. Each airplane seat could be monitored effectively through the system prior to takeoff or during flight. Additionally, the comparatively large bandwidth available in a WISB network enables the utilization of face recognition software for early detection of terrorists, highjackers, or other high-risk individuals onboard. Using a WISB network, early detection of unwanted individuals is possible using a high-definition camera, which may be installed at a airport terminal, gate, and/or check-in counter. Such a camera may obtain and transmit digital images to a face-recognition processor in an airport security unit for analysis and comparison with facial recognition data maintained in a global database of known terrorists. Due to the vast amount of data required for face recognition processing, super broadband may be desirable for transmitting the best possible details of an individual's face and to produce a result equal to or better than a fingerprint of the individual.

A network, according to various aspects of the present invention facilitates communication among and between four layers: a local layer, a regional layer, an inter-regional layer, and a global layer. Message routing is preferably accomplished within one layer (e.g., the local layer), but may also include traffic between layers. For example, network 100 of FIG. 1 includes local layer 120, regional layer 140, inter-regional layer 160, and global layer 180.

Local layer 120 includes any number of SIDA platforms (e.g., 121-123) which may be fixed or mobile. Each SIDA platform 122 may communicate via a wireless link 134 (135) with any other SIDA platform 121 (123) within range. Each SIDA platform may have zero or more user devices 110 (e.g., output devices such as displays, input devices such as a keyboard, storage devices such as tapes and disks, processing devices such as personal computers, and combinations of the above). Each SIDA platform 121-123 may communicate via a wireless link 131-133 with zero or more SOMA platforms 142 of the regional layer.

Regional layer 140 includes any number of SOMA platforms (e.g., 141-143). Typically, a SOMA platform 142 (e.g., a tower mounted platform) is located centrally in a region occupied by any number of SIDA platforms 121-123. Each SOMA platform 142 may communicate via a wireless link 154 (155) with any other SOMA platform within range. Each SOMA platform 142 controls zero or more computers or servers 146 (e.g., a personal information computer farm) and controls access to other networks 148 (e.g., the Internet). Each SOMA platform 142 may communicate via a wireless link 151-153 with zero or more PAU platforms 162 of the inter-regional layer.

Inter-regional layer 160 includes any number of PAU platforms (e.g., 161-163). Typically, a PAU platform 162 (e.g., a tower mounted platform) is located within range of several SOMA platforms 141-143. Each PAU platform 162 may communicate via a wireless link 174 (175) with any other PAU platform within range. Each SOMA platform 142 may communicate via a wireless link 171-173 with zero or more satellite platforms 181 of the global layer 180 or via troposcatter.

A platform generally includes a processor, a transceiver unit having any number of transceivers (e.g., 6), and an antenna unit having a corresponding number of antenna arrays (e.g., 6). For example, platform 200 of FIG. 2 includes processor 202, transceiver unit 204, and antenna unit 206. Processor 202 includes a box office controller 210, gateway controller 212, and user device interface 214. User interface 214 provides ports 215 for cable connections to devices local to the platform. For example, devices may perform display (e.g., output) or storage functions. Display devices 216 include TV, stereo, printer, and FAX machine. Storage devices include DVD, VCR, and PC. Transceiver unit 204 includes any number of frequency agile transceivers 232 and may include a fiber optic transceiver 234 for each trunk 236. Processor 202 directs transceivers of transceiver unit 204 via line 203 to implement frequency agility. Processor 202 may direct beamforming by any antenna array (e.g., 242 or 244) via line 205. In an alternate antenna unit, beams are preset and control by processor 202 is omitted.

Figure 2:
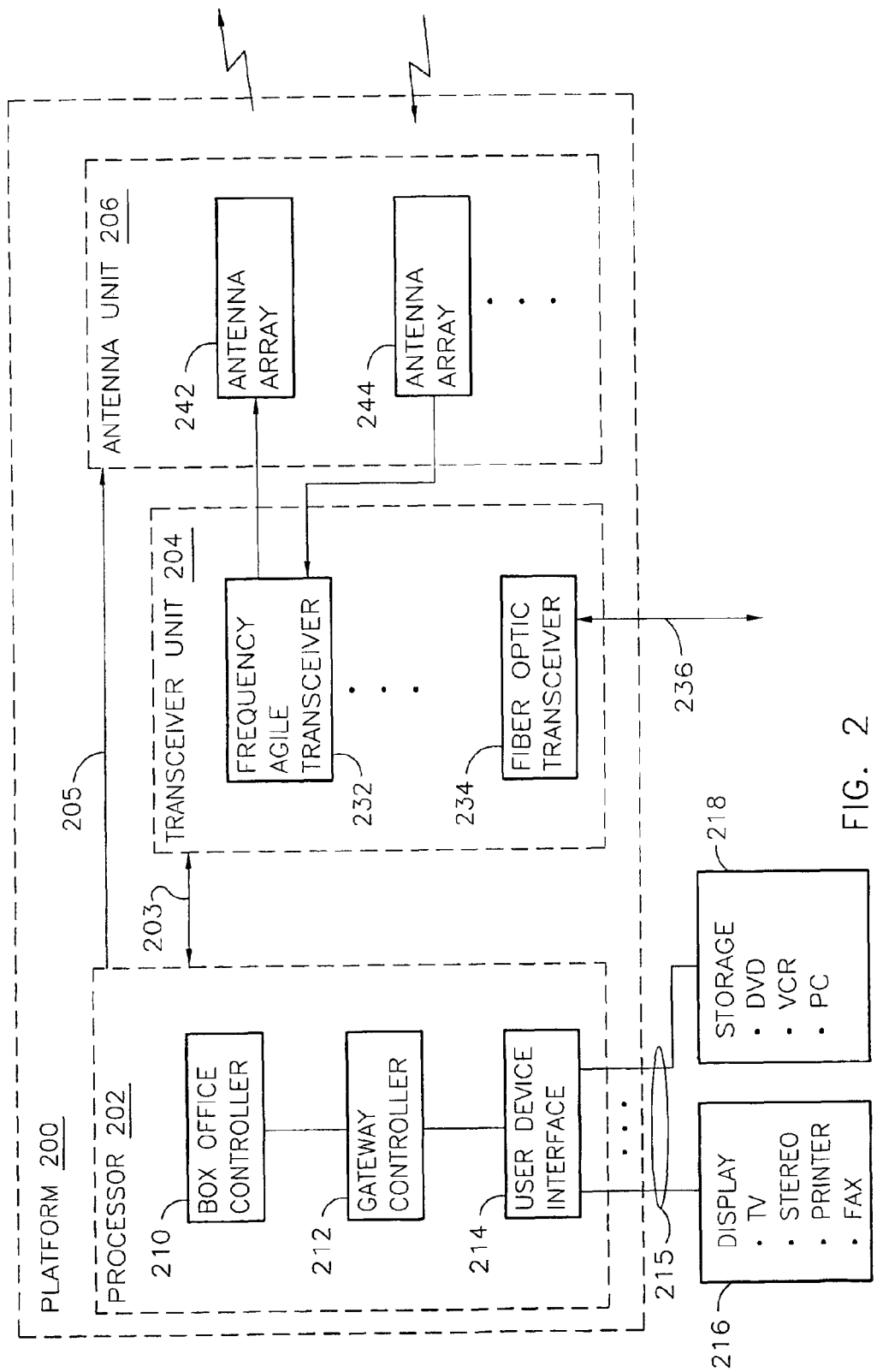
FIG. 2 is a functional block diagram of a platform used in the network of FIG. 1.

FIG. 2 provides a schematic representation of a platform (e.g., a SIDA, SOMA, or PAU platform) according to various aspects of the present invention. The SIDA platform includes a processor, transceiver unit, and antenna unit. The antenna unit includes a small, full duplex, electronically interactive, directional, high gain, random angle phased array. The transceiver unit includes an RF modulator, low power supply, microwave unit, and remote on/off control switch. The antenna unit of a SIDA platform is preferably installed on a user's rooftop or other high, unobstructed location. SIDA platforms may be spaced at distances ranging between a few meters up to about 5 Km. A SIDA platform provides the communication gateway to a user's home for mobile and fixed wireless communications, digital TV reception, digital 3D interactive TV, video on demand in digital format (e.g., DVD quality), digital radio broadcast, and continuous high speed Internet connection. A SIDA platform differs from SOMA and PAU platforms by: (1) including a user device interface (e.g., ports) for connecting the platform to a TV, VCR, DVD, Stereo, personal computer (PC), Fax machine, and/or a printer/scanner; (2) including a home gateway box office controller unit; and (3) omitting a fiber optic transceiver.

A SOMA platform, according to various aspects of the present invention, provides longer range (than a SIDA) communication and provides coordination of SIDA communications. The SOMA platform may include a fiber optic transceiver for communication on trunk lines to other SOMA and/or PAU platforms. SOMA platforms are generally located inside "clusters" or "conglomerates" of SIDA platforms (i.e., service regions), and may have coordinating responsibility for an area of up to a 60 Km radius. Each SOMA platform may be connected to other SOMA platforms via fiber-optic trunk lines. A SOMA platform may further include a high speed media access control (MAC) level router with a connection gateway to other networks (e.g., the Internet and World Wide Web).

The processor of a WISB platform (e.g., a MAC level routing system) integrates a number of protocols including channel access protocol, neighbor platform link management protocol, wireless multi-hop routing and multi-cast protocol, remote network management protocol, and network security protocol.

The channel access protocol governs: (a) scheduling of transmissions, (b) spectrum reuse (frequency agility), and (c) avoidance of collisions of message packets. Algorithms implementing such a protocol may include the following functions: (1) independent scheduling of network management message packets, (2) negotiated scheduling between platforms for a single RF channel multiple user facility of non-interfering data transmission between pairs of platforms, and (3) frequency agility, coding, and power control.

The neighbor platform link management protocol governs: (a) efficient platform to platform message packet delivery, (b) automatic adaptation to changes in platform configuration, availability (e.g., becoming available for communication due to movement, installation, or power applied), and quality in real time routing decisions based on current overall local network status (including transmitting and receiving with a platform of a different type: SIDA/SOMA, SOMA/PAU), (c) automatic synchronization algorithm for the network, and (d) error control coding rates between SIDA platforms, SOMA platforms, and PAU platforms related to: (1) SIDA to SIDA links, (2) SIDA to SOMA links (3) SOMA to SOMA links, (4) SOMA to PAU links, (5) PAU to PAU links via troposcatter (synchronized with the PAU remote network management protocol), and (6) PAU to PAU links via satellite (synchronized with the PAU remote network management protocol).

The wireless multi-hop routing and multicast protocol governs: (a) reliability in delivery of message packets, (b) efficient multicast mechanisms over wireless broadcast channels, and (c) dynamic ad-hoc network creation (e.g., finding available unused communications capability along the shortest path to the destination for efficient use of the spectrum).

The remote network management protocol governs the automatic distribution and upgrades of operating software to SIDA, SOMA, PAU and satellite platforms, home gateway controllers, and PI computer farms using a dynamic graphical user interface (GUI).

The network security protocol governs: (a) hopping patterns from SIDA to SIDA, SIDA to SOMA, SOMA to SOMA, and PAU to PAU via troposcatter or satellites, (b) automatic authentication of SIDA platforms upon (1) addition of a platform and (2) deletion of a platform, and (c) intrusion protection and packet filtering (e.g., by dynamic control of the RF waveform to prevent eavesdropping).

A computer farm may be attached to a SOMA or PAU platform. The computer farm facilitates broadband computing using the home gateway controller processor of a SIDA platform for access to the remote PI computer farm. Computers of the farm process and store information requiring heavy processing. The TV screen of a SIDA platform may be used as the visual media and a home gateway controller keyboard of the SIDA platform may be used to perform physical entries.

The SIDA and SOMA platform transceivers provide the interconnecting and coordinating functions for mobile and fixed wireless communications for distribution to SIDA platforms anywhere in the WISB network, mobile units inside of the SOMA communications conglomerate, and resources on outside networks through conventional switching and routing stations. SOMA platforms interconnect via existing fiber-optic trunk lines during the build-out phases, until within communication range of a neighboring SOMA platform, at which point the fiber-optic trunk line may serve as a redundant structure, not essential for network communication. SOMA platforms may communicate with PAUs via existing fiber-optic trunk lines during the build-out phase, until within communication range of a neighboring SOMA platform, at which point the fiber-optic trunk line may serve as a redundant structure, not essential for network communication.

The SOMA platforms provide the coordinating basis for digital telecommunication (FWA and MWA), Digital TV reception, digital 3D interactive TV, digital video on demand, digital radio broadcast, and for continuous high speed Internet connection, distributed through the SIDA platforms.

A PAU platform, according to various aspects of the present invention, provides longer range (than a SOMA) communication and provides conveyance of communication to SOMA platforms, to other PAUs, and to other networks. A PAU platform has a range of up to 1,000 Km using the troposphere as a mirror to bounce the signals ("troposcatter") from one PAU platform to the next. The PAU platform communicates globally via multi-hops from PAU tower to PAU tower.

The processor of a PAU platform performs protocols analogous to those discussed above, for example, where a SOMA processor coordinates SIDA platform communication, a PAU processor coordinates SOMA platform communication.

Figure 3:
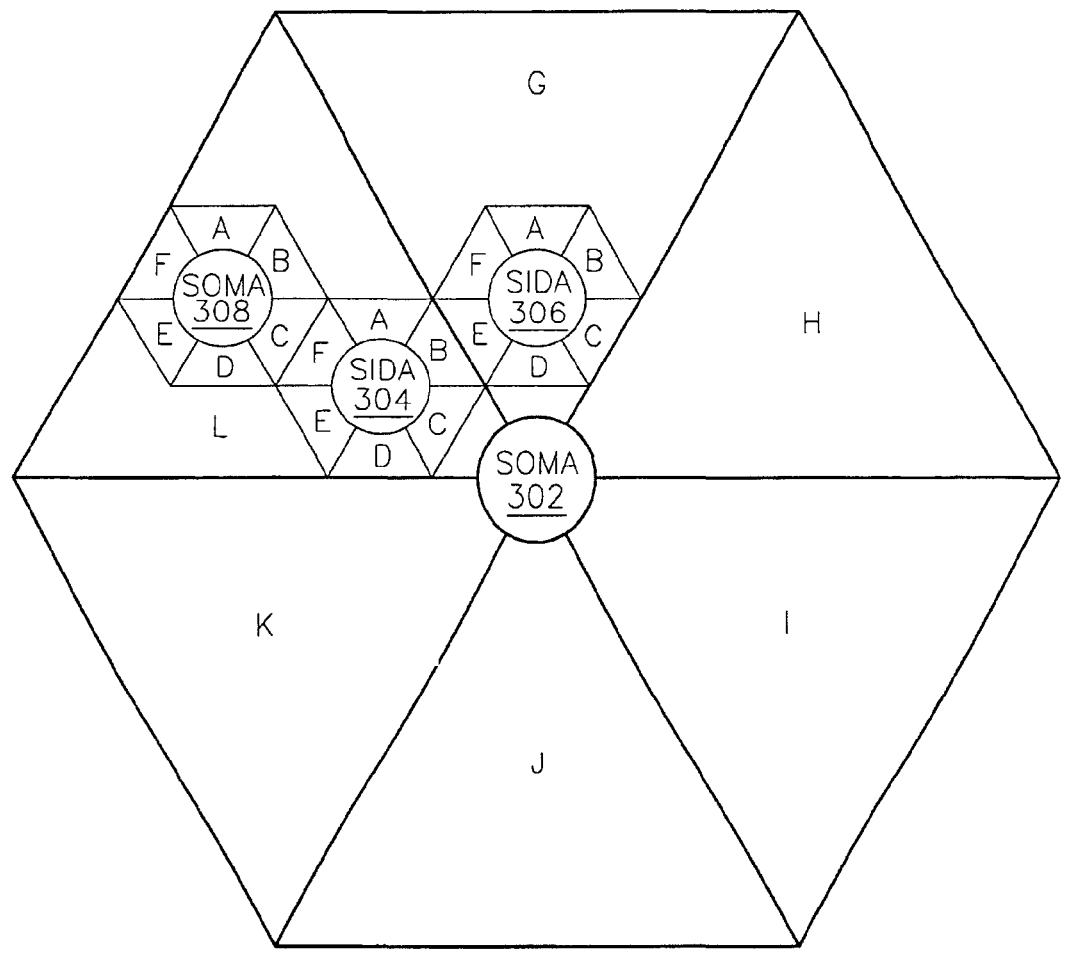
FIG. 3 is a diagram of overlapping areas of communication coverage for a portion of the system of FIG. 1.

SIDA and SOMA platform communication ranges overlap when a SOMA platform is centrally located amid SIDA platforms. For example, SOMA platform 302 of FIG. 3 has six communication sectors A-F used for SOMA to SIDA communication and six communication sectors G-L used for SOMA to SOMA communication. To facilitate independent communication, frequencies selected for overlapping sectors are different. For example, a frequency used for sector G is different from any frequency used in sectors A-F of SIDA 306; and a frequency used for sector L is different from any frequency used in sectors A-F of SIDA 304 and SOMA 308. SOMA to SIDA communication may be facilitated by operation of a SOMA 308 with sectors, frequencies, and range similar or identical to SIDA to SIDA communication. For clarity SOMA 308 is shown with SIDA style frequency, sector, and range allocations. SOMA 308 communicates with SOMA 302 using SOMA style frequency, sector, and range allocations not shown. Many channels of SIDA to SIDA communication may therefore be simultaneous with SOMA to SOMA communication in one SOMA size sector.

Figure 4:
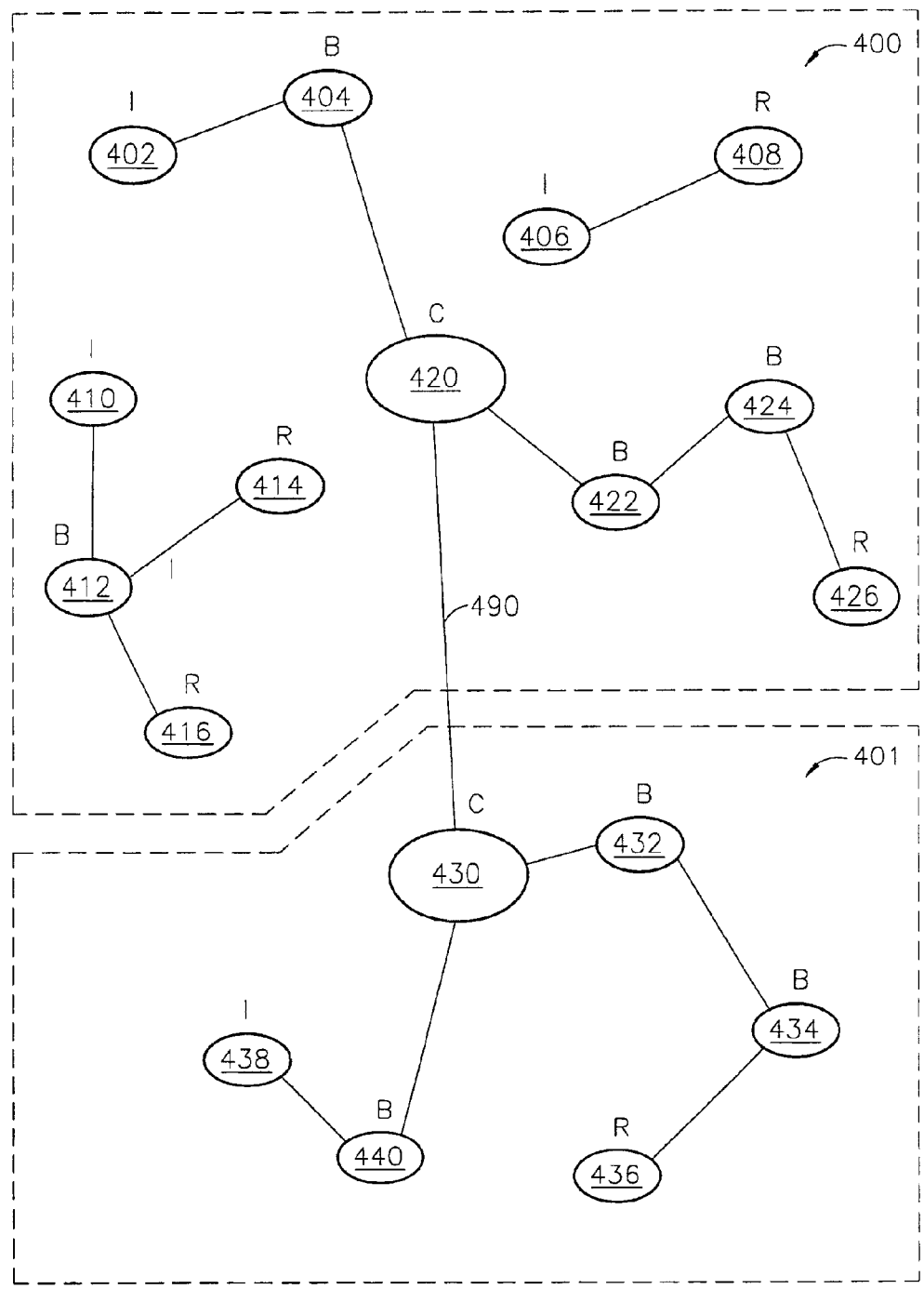
FIG. 4 is a diagram of communication routes in a portion of the system of FIG. 1.

FIG. 4 depicts a SOMA communications conglomerate 400, wherein neighboring pairs of SIDA platforms are able to communicate with each other either directly or facilitated by a free channel within any given SIDA platform. The SIDA platform having a free channel may act as a so-called SIDA catalyst in the connection (performing a conveying function for this communication). As discussed above, each SOMA platform performs network protocols for assisting, directing, and informing about a given transmission as it occurs from an initiator (indicated "I" in FIG. 4) via one or more catalysts (indicated "B" in FIG. 4) via one or more coordinators (indicated "C" in FIG. 4) to a receiver (indicated "R" in FIG. 4). The SOMA platform monitors the routing and length of each communication (i.e., a call). Calls that are out of the WISB network are routed through a SOMA platform.

For example, SIDA 402 initiates a call to SIDA 426 that passes through SIDA 404, SOMA 420, SIDA 422, and SIDA 424. Calls may be direct as when SIDA 406 initiates a call to SIDA 408. Calls may overlap through a single SIDA. For example, SIDA 410 initiates a call to SIDA 416; and SIDA 412 initiates a call to SIDA 414. SIDA 412 acts as a catalyst for the former call and as an initiator for the latter.

FIG. 4 also depicts two unattached SOMA communications conglomerates 400 and 401 and illustrates their interaction. If a call initiated at SIDA 402 is directed to SIDA 436, the call is routed through a free channel in each intervening SIDA and SOMA platform: 404, 420, 430, 432, 434, and 436. Link 490 may be a fiber optic link as discussed above In a variation, platforms 420 and 430 may be PAU platforms and link 490 a troposcatter or satellite link. The wireless multi-hop routing and multicast protocol governing the network routing system at SOMAs 420 and 430 automatically routes the call through SIDAs having the fewest hops (typically the closest SIDAs and shortest physical distances). The wireless multi-hop routing and multicast protocol always commands intervening SIDA platforms to use the shortest route to the recipient (R) to be taken around any given physical obstructions that may impair the line of sight (or that may not be in compliance with the 802.11b restrictions when using the 5.8 GHz unlicensed band).

A fiber optic cable for transporting communication between SOMA communications conglomerates 400 and 401 is necessary only when using the unlicensed 5.8 GHz frequency and complying with the 802.11 b restrictions. If the network is built around a licensed frequency, the fiber optic link may be omitted, subject to the distance between the SOMA platforms and geographical constraints (line of sight).

Unattached SOMA communications conglomerates become attached when close neighboring SIDA platforms become available, as discussed above.

Transmissions are packetized and all packets are preferably transmitted through the shortest path through the network. Packets of the same call may travel different routes through the network, but as they arrive at the Recipient SIDA platform, the packets are assembled in the correct sequence. The channel access protocol algorithms will govern the entire transmission, and facilitate suitable quality of service at either end of the transmission cycle (Initiator and Recipient).

By adding platforms to a WISB network, additional routes are created facilitating delivery of data at greater bandwidth. For example, a maximum bandwidth achieved for a single SIDA may be calculated for each of several modulation and antenna configurations. Assuming all channels are of equal bandwidth, the maximum bandwidth for each row of Table 1 is calculated by multiplying the channel bandwidth (assumed to be 100 MHz for operation at 5.8 GHz) by the modulation factor; and multiplying the result by the beam factor. The beam factor assumes that full duplex communication is intended and two beams are therefore needed for the maximum bandwidth to be achieved. A modulation factor of 6 corresponds to quadrature amplitude modulation (QAM) having 64 steps and a factor of 8 corresponds to QAM having 256 steps. As shown, a single user consuming data from all beams simultaneously of his or her SIDA platform can consume up to 25.6 Gbps half duplex and at the same time provide up to 25.6 Gbps half duplex on other beams.

TABLE 1

| Modulation Factor | Number of Beams | Beam Factor | Maximum Single User Bandwidth (Gbps) |
| --- | --- | --- | --- |
| 6 | 16 | 8 | 4.8 |
| 8 | 16 | 8 | 6.4 |
| 6 | 32 | 16 | 9.6 |
| 8 | 32 | 16 | 12.8 |
| 6 | 64 | 32 | 19.2 |
| 8 | 64 | 32 | 25.6 |

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A subscriber platform operated by a subscriber, the subscriber platform comprising:
- an antenna that provides a plurality of directional beams;
- a plurality of receivers operating simultaneously, each receiver coupled to the antenna for receiving via a respective directional beam, at least two receivers of the plurality providing a respective non-redundant received data stream from the network at a respective data rate;
- a display that presents a presentation in accordance with aggregated data;
- a transceiver coupled to the antenna that performs a routing function for the network via at least two directional beams of the plurality; and
- a processor coupled to the display, wherein:
    - (1) each directional beam has a respective direction determined in response to the processor;
    - (2) each receiver uses a respective frequency channel determined in response to the processor; and
    - (3) the processor assembles the aggregated data, the aggregated data being assembled in sequence and derived from at least a part of each respective received data stream, the aggregated data having an aggregated data rate greater than each respective data rate.

2. The platform of claim 1 wherein the processor further: receives routing information from the network; and enables an additional receiver for receiving an additional data stream for combining with the aggregated data for increasing the aggregated data rate.

3. The platform of claim 1 wherein receiving is connection-oriented.

4. The platform of claim 1 wherein receiving is connectionless.

5. The platform of claim 1 wherein the aggregated data is assembled in a form identical to a form of a particular respective received data stream but for the aggregated data rate being greater than the maximum data rate of the particular respective received data stream.

6. A method performed by a subscriber platform, the subscriber platform operated by a subscriber, the subscriber platform comprising an antenna, a receiver coupled to the antenna, the method comprising:
- receiving non-redundant information on several channels, each channel associated with a direction of the antenna and a frequency for receiving information;
- aggregating the information into a sequence; and
- displaying a presentation in accordance with the sequence.

7. The method of claim 6 wherein the sequence is provided in a form identical to a form of information received on one of the several channels but for an increased data rate.

8. The method of claim 6 wherein the information received on each channel comprises a respective plurality of packets and the sequence comprises each respective plurality of packets.

* * * * *